(12) United States Patent
Messina

(10) Patent No.: US 6,866,191 B2
(45) Date of Patent: Mar. 15, 2005

(54) METHOD AND SYSTEM FOR GENERATING AND ADMINISTERING VEHICLE LICENSE PLATES

(76) Inventor: James D. Messina, 18 W. 076 Jamestown La., Villa Park, IL (US) 60181

( * ) Notice: Subject to any disclaimer, the term of this patent is extended or adjusted under 35 U.S.C. 154(b) by 0 days.

(21) Appl. No.: 10/314,382

(22) Filed: Dec. 6, 2002

(65) Prior Publication Data

US 2003/0132295 A1 Jul. 17, 2003

Related U.S. Application Data

(60) Provisional application No. 60/338,980, filed on Dec. 6, 2001.

(51) Int. Cl.[7] ............................................. G06F 17/00
(52) U.S. Cl. ..................... 235/375; 235/384; 235/486; 235/376; 705/1; 705/13
(58) Field of Search ................................. 235/375, 380, 235/384, 376, 486; 40/200–210; 340/933; 705/1, 13, 28

(56) References Cited

U.S. PATENT DOCUMENTS

| | | | |
|---|---|---|---|
| D269,125 S | | 5/1983 | Mora et al. |
| 5,815,965 A | * | 10/1998 | de Greeve ................... 40/209 |
| 5,851,117 A | | 12/1998 | Alsheimer et al. |
| 6,076,064 A | * | 6/2000 | Rose, Jr. ......................... 705/1 |
| 6,238,122 B1 | * | 5/2001 | Brooks et al. ................ 403/24 |
| 6,324,778 B1 | * | 12/2001 | Gall ............................. 40/594 |
| 6,570,674 B2 | * | 5/2003 | Pleotis ....................... 358/1.2 |
| 6,594,926 B1 | * | 7/2003 | Wujciga ...................... 40/200 |
| 6,603,999 B2 | * | 8/2003 | SerVaas ......................... 607/5 |
| 6,641,038 B2 | * | 11/2003 | Gehlot et al. ............... 235/384 |
| 2004/0073798 A1 | * | 4/2004 | Look et al. .................. 713/175 |

OTHER PUBLICATIONS

Jesse White, Illinois Secretary of State, "Illinois License Plate Guide 2001–2002," 46 pages, date unknown.

* cited by examiner

*Primary Examiner*—Jared J. Fureman
*Assistant Examiner*—Ahshik Kim
(74) *Attorney, Agent, or Firm*—Wallenstein Wagner & Rockey, Ltd.

(57) ABSTRACT

A method and system for generating and administering vehicle license plates is disclosed. A third party entity provides a database of advertising indicia adapted to be placed on a vehicle license plate. The database is made available to vehicle owners. A vehicle owner selects an advertising indicia to be placed on a license plate. The third party entity provides registration indicia to be placed on the license plate. The third party entity provides inputted vehicle owner information, the selected advertising indicia and registration indicia to the government. The government issues a license plate to the vehicle owner, wherein the issued license plate includes the selected advertising indicia and the registration indicia.

10 Claims, 4 Drawing Sheets

METHOD AND SYSTEM FOR GENERATING AND ADMINISTERING VEHICLE LICENSE PLATES

CROSS-REFERENCE TO RELATED APPLICATIONS

This application claims the benefit of U.S. Provisional Application No. 60/338,980 filed Dec. 6, 2001.

TECHNICAL FIELD

The present invention relates generally to a method and system for administering vehicle license plates, and in particular a method and system for generating vehicle license plates having advertising indicia thereon.

BACKGROUND OF THE INVENTION

Licensing authorities, such as state or other government entities, commonly have a vehicle registration system that tracks ownership information and other relevant information of residents owning and operating vehicles in the state. As a part of the system, the government issues license plates that must be affixed to the vehicle. The license plates include identifying indicia such as a series of letters and numbers. As a further aspect of the system, the state collects a fee from vehicle owners to support the obligations of the government. Governments can benefit from additional methods to increase the fees they can collect from their vehicle registration systems.

The present invention is provided to solve these and other problems.

SUMMARY OF THE INVENTION

A method and system for generating and administering vehicle license plates is disclosed.

According to a first aspect of the invention, a third party entity provides a plurality of advertising indicia adapted to be placed on a vehicle license plate. The database is made available to vehicle owners. A vehicle owner selects an advertising indicia to be placed on a license plate. The third party entity provides registration indicia to be placed on the license plate. The third party entity provides inputted vehicle owner information, the selected advertising indicia and registration indicia to the government. The government issues a license plate to the vehicle owner, wherein the issued license plate includes the selected advertising indicia and the registration indicia.

According to another aspect of the invention, a computer program for generating and administering the issuance of vehicle license plates is provided. The computer program comprises a plurality of code segments. A first code segment is provided for accessing a third party system server having a database stored thereon. The database comprises a plurality of advertising indicia adapted to be placed on a vehicle license plate and a plurality of registration indicia. A second code segment receives an input transmission of vehicle owner information. A third code segment receives an input transmission corresponding to the selected one of the plurality of advertising indicia to be placed on a vehicle license plate. A fourth code segment receives an input transmission of vehicle owner information. A fifth code segment receives an input transmission of registration indicia. A sixth code segment associates the input transmission of the registration indicia with the input transmission of vehicle owner information and the input transmission corresponding to the selected advertising indicia. And, a seventh code segment transmits the associated information to the third party system server. The third party server provides the associated information to a license plate manufacturer.

Other aspects of the invention will become apparent in view of the following drawings taken in conjunction with the following description.

DETAILED DESCRIPTION

Figure 1:
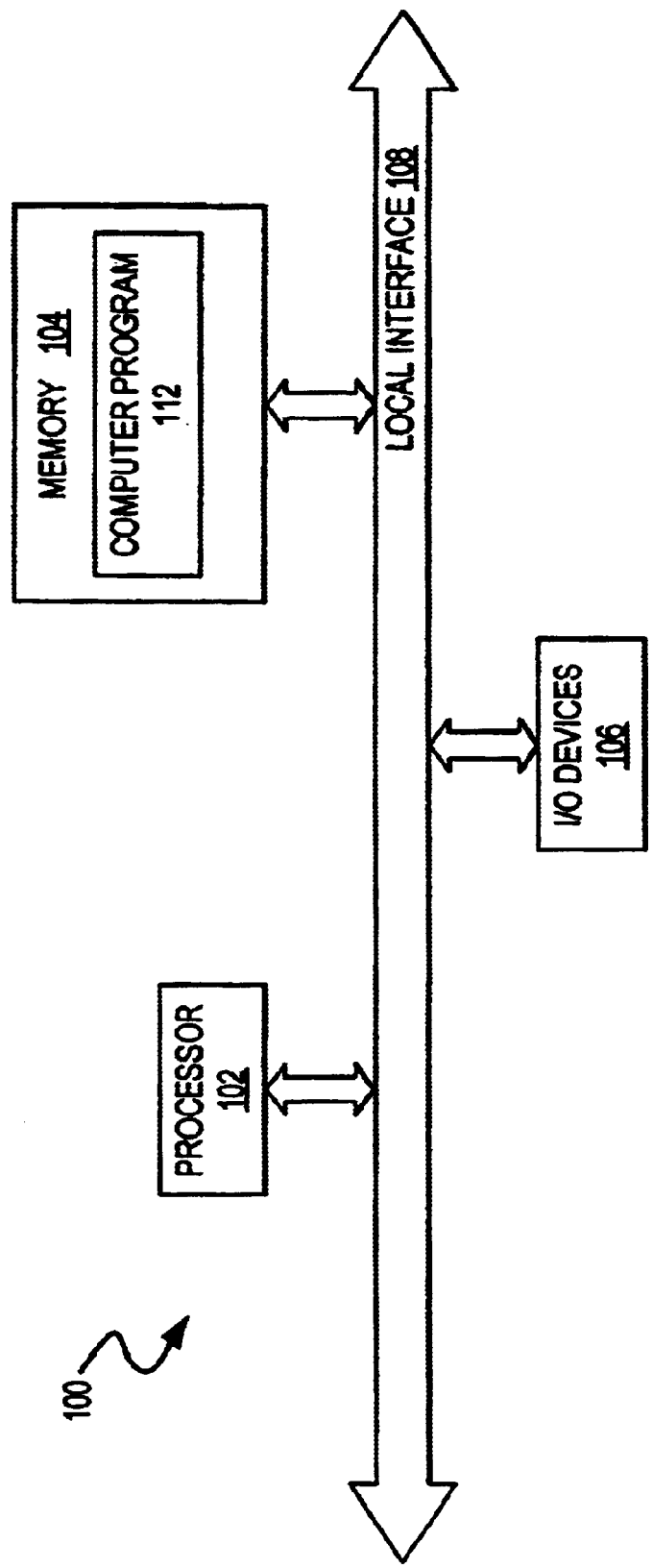
FIG. 1 is a schematic drawing illustrating a computer used in connection with the system of the present invention.

While this invention is susceptible of embodiments in many different forms, there is shown in the drawings and will herein be described preferred embodiments of the invention with the understanding that the present disclosure is to be considered as an exemplification of the principles of the invention and is not intended to limit the broad aspect of the invention to the embodiments illustrated.

The present invention is generally directed to a vehicle license plate system administered by a government licensing authority in conjunction with third parties such as corporations, and sponsors. The third party sponsors provide a variety of advertising indicia and pay a fee to the government to apply the advertising indicia to license plates as selected by vehicle owners. According to the present system, sponsor contracts with the government licensing authority to provide a specific number of license plates bearing insignia provided by the sponsor. The sponsor provides artwork of at least one indicia. It is contemplated that one sponsor may provide multiple indicia. It is also contemplated that multiple sponsors can participate in the program. The advertising indicia are made available to vehicle owner's so that the vehicle owners can select a desired advertising indicia to be placed on a license plate. The government then issues a license plate to the vehicle owner having the selected advertising indicia and registration indicia. The issued license plate is adapted to be affixed to a vehicle owner's vehicle. Additionally, a renewal system can be provided where the third party entity provides renewal notices wherein a vehicle owner can decide to continue with the same advertising indicia or change to a different advertising indicia.

With the present system, a government can increase its vehicle license plate revenues by receiving additional fees from businesses. Businesses can also increase their advertising exposure. This system may also be used by licensing authorities in connection with other types of licenses. The fee paid by the business can be based on a minimum order size required by the government. As discussed in detail below, the system can be automated and thereby administered through a computer program accessible through web site pages if desired.

According to one embodiment of the present invention, the system can be implemented by use of an executable computer program. A preferred embodiment of the computer program for executing the method and operation of the system will now be described in greater detail.

Figure 2:
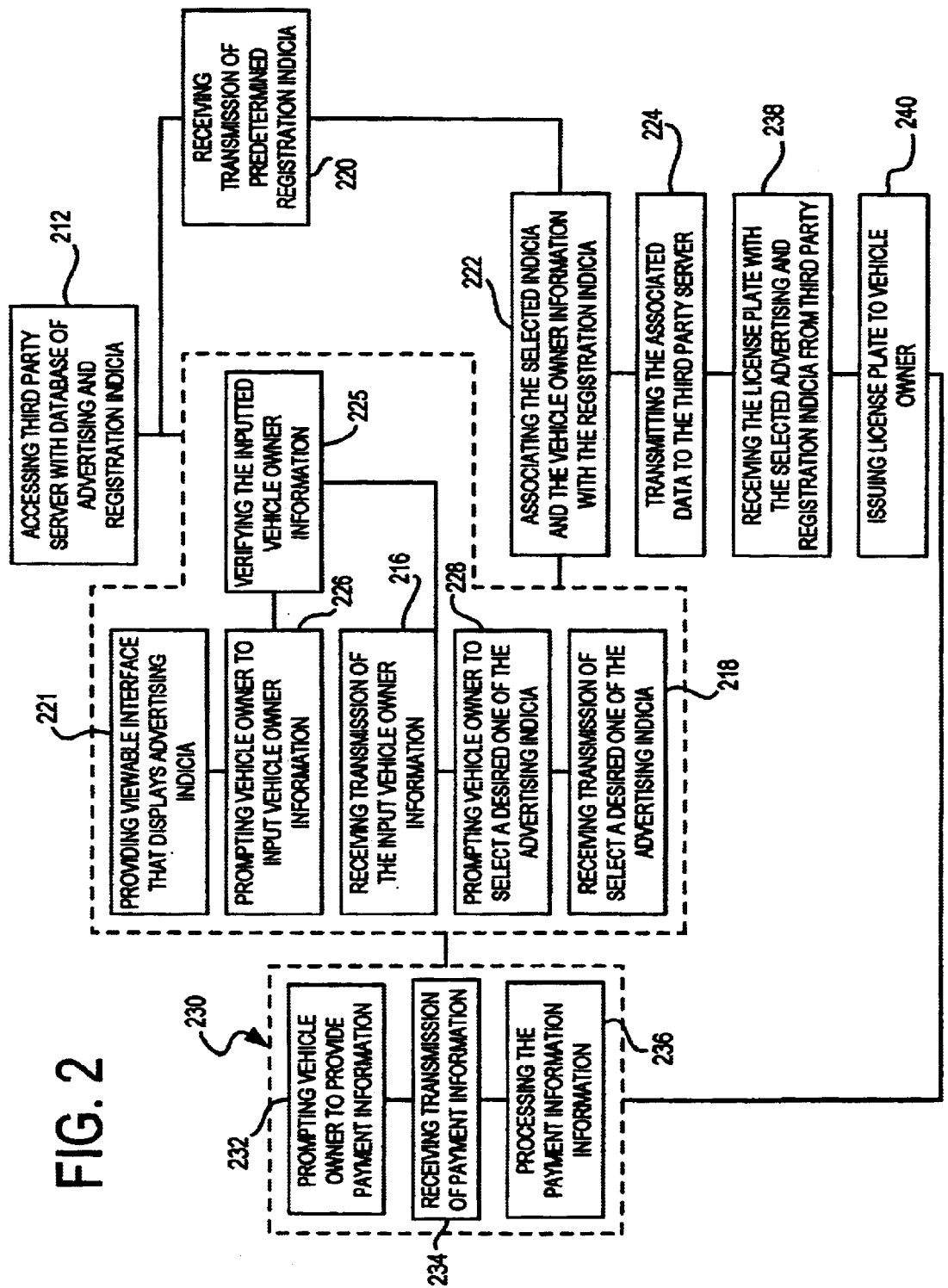
FIG. 2 is block diagram illustrating the method of the present invention.

FIGS. 1 and 2 are a schematic diagrams of a computer 100 and software in the form of an executable computer program of the present invention. Generally, the computer program is executed by one or more special or general purpose digital computer(s), such as a personal computer (PC; IBM-compatible, Apple-compatible, or otherwise), personal digital assistant, workstation, minicomputer, or mainframe computer. The computer program 112 may reside in, or have portions residing in, any computer such as, but not limited to, a general purpose personal computer. Therefore, computer 100 of FIG. 1 may be representative of any computer in which the computer program 112 resides or partially resides.

Generally, in terms of hardware architecture, the computer 100 includes a processor 102, memory 104, and one or more input and/or output (I/O) devices 106 (or peripherals) that are communicatively coupled via a local interface 108. The local interface 108 can be, for example, but not limited to, one or more buses or other wired or wireless connections, as is known in the art. The local interface 108 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 102 is a hardware device for executing software, particularly software stored in memory 104. The processor 102 can be any custom made or commercially available processor, a central processing unit (CPU), an auxiliary processor among several processors associated with the computer 100, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation.

The memory 104 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 104 may incorporate electronic, magnetic, optical, and/or other types of storage media. The memory 104 can have a distributed architecture where various components are situated remote from one another, but can be accessed by the processor 102.

The software in memory 104 may include one or more separate programs, each of which comprises an ordered listing of executable instructions for implementing logical functions. The software in the memory 104 includes the computer program 112 in accordance with the present invention and a suitable operating system (O/S) 111. A non-exhaustive list of examples of suitable commercially available operating systems 111 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 111 controls the execution of the present computer program.

The computer program embodying the present invention may be a source program, executable program (object code), script, or any other entity comprising a set of instructions to be performed. When a source program, the program needs to be translated via a compiler, assembler, interpreter, or the like, which may or may not be included within the memory 104, so as to operate properly in connection with the O/S 111. Furthermore, the computer program 112 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In one embodiment, the computer program 112 is written in C++. In other embodiments the medical device operating system is created using Power Builder. The I/O devices 106 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 106 may also include output devices, for example but not limited to, a printer, bar code printers, displays, etc. Finally, the I/O devices 106 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 100 is a PC, workstation, PDA, or the like, the software in the memory 104 may further include a basic input output system (BIOS). The BIOS is a set of essential software routines that initialize and test hardware at startup, start the O/S 111, and support the transfer of data among the hardware devices. The BIOS is stored in ROM so that the BIOS can be executed when the computer 100 is activated.

When the computer 100 is in operation, the processor 102 is configured to execute software stored within the memory 104, to communicate data to and from the memory 104, and to generally control operations of the computer 100 pursuant to the software. The computer program 112 and the O/S 111, in whole or in part, but typically the latter, are read by the processor 102, perhaps buffered within the processor 102, and then executed.

It should be noted that the computer program 112 can be stored on any computer readable medium for use by or in connection with any computer related system or method. In the context of this invention, a A computer-readable medium@ can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Figure 3:
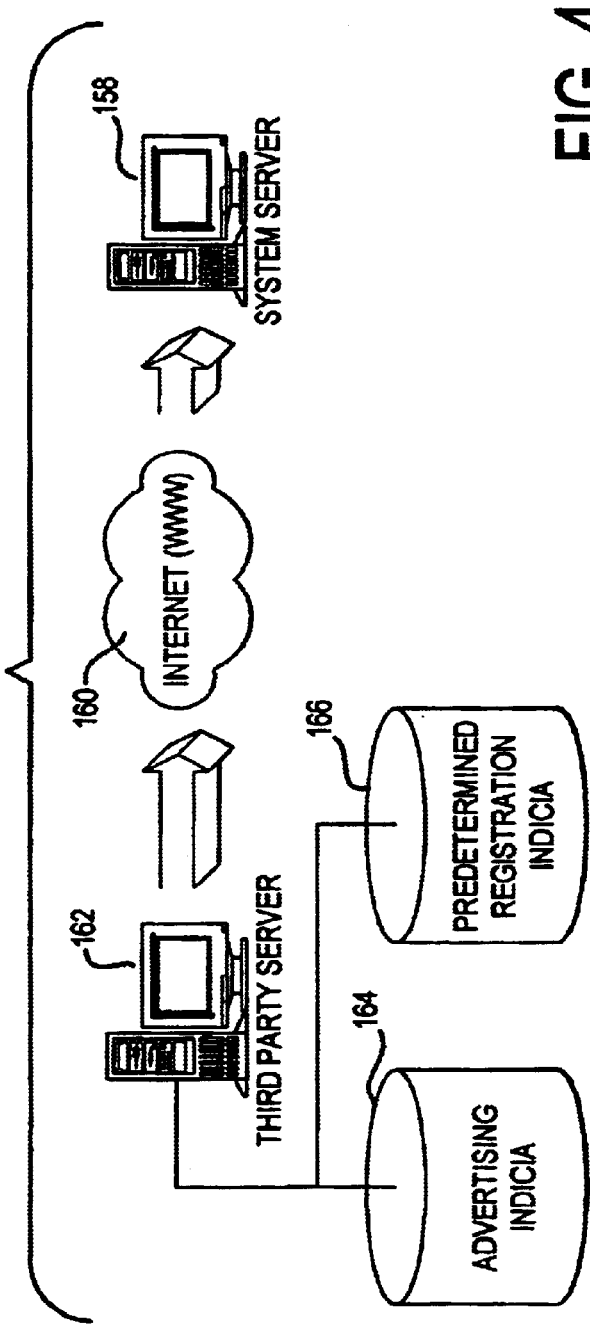
FIG. 3 is a schematic diagram illustrating the interface between a system server and a third party server via an Internet web interface.

As seen in FIG. 3, a system server 158 is generally provided or authorized by the government licensing authority. The system server 158 maintained in operable communication with a third party system server 162. The third party system server 162 has a first database 164 and a second database 166 stored thereon. The first database 164 comprises a plurality of advertising indicia adapted to be placed on a vehicle license. The second database 166 comprises a plurality of registration indicia. While the preferred embodiment includes a first and second database 166 for separately storing the advertising indicia and the registration indicia, it is contemplated that the advertising and registration indicia be contained in a single databases stored on a third party server. It is also contemplated that separate parties store separate databases for advertising and registration indicia. Thus, the present invention contemplates that any configuration in which at least one third party entity provides the advertising and registration indicia is suitable, and thus will not depart from the spirit of the present invention. Furthermore, a database according to the present invention may be any single indicia compilation of a indicia whether or not in electronic form.

Now will be described in detail the computer program for generating and administering vehicle license. Process descriptions or blocks in FIG. 2 should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

The computer program comprises a plurality of software code segments. A first code segment is provided for accessing the third party system server 212. A second code segment receives an input transmission from the first database 164 of the plurality of advertising indicia 214. A third code segment receives an input transmission of vehicle owner information 216. A fourth code segment receives an input transmission corresponding to a selected one of the plurality of advertising indicia 218. A fifth code segment receives an input transmission from the second database 166 of the registration indicia 220. A sixth code segment associates the input transmission of the registration indicia with the input transmission of vehicle owner information and the input transmission of the selected advertising indicia 222. And, a seventh code segment transmits the associated data to the third party system server 224. The third party server provides the associated information to a license plate manufacturer. It is contemplated by the present invention that the a code segment be provided that verifies the inputted vehicle owner information to verify that identity or background of the applicant 225.

According to one embodiment of the present invention illustrated by FIG. 3, the method includes providing a web interface (221), thereby allowing access to the system through web pages transmitted over the Internet. As will be appreciated by one skilled in the art, the Internet comprises a number of computers and computer networks that are interconnected through communication links. The interconnected computers exchange information using various services, such as electronic mail and the World Wide Web (Awww@). The www allows a server computer system (i.e., Web server or Website) to send graphical web pages of information to a remote client computer system. The remote client computer system can then display the web pages on a display screen such as a cathode ray tube or the like.

It will also be appreciated by those skilled in the art that each resource (e.g., computer or Web page) of the www is uniquely identifiable by a Uniform Resource Locator (AURL@). To view a specific web page, a client computer system specifies the URL for that web page in a request (e.g., a HyperText Transfer Protocol (AHTTP@) request). The request is forwarded to the web server that supports that web page. When that web server receives the request, it sends that web page to the client computer system. When the client computer system receives that web page request, it typically displays the web page using a browser. A browser is a special-purpose application program that effects the requesting of web pages and the displaying of web pages on a display screen.

Currently, web pages are typically defined using Hyper-Text Markup Language (AHTML@). HTML provides a standard set of tags that define how a web page is to be displayed. When a user indicates to the browser to display a web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other web pages available on that server computer system or other server computer systems.

In this embodiment of the invention, the web interface 160 is operably connected to the system server 162 such that the plurality of advertising indicia are viewable through the web interface 160. The web interface 160 can also be adapted to receiving input commands. For example, the web interface 160 may be used in connection with a separate user input/output interface as described above such as a touch screen wherein appropriate data is inputted by selecting various icons.

A prompt is displayed to a vehicle owner on the web interface 160 prompting the vehicle owner to input vehicle owner information 226. Such vehicle owner information can include demographic information, current license plate number and any other information required by the governmental licensing authority with which the vehicle owner is attempting to register. Once the vehicle owner inputs the requested vehicle owner information, the input data is transmitted from the web interface 160 to the system server. A prompt is also appears on the web interface 160 prompting the vehicle owner to select one of the plurality of advertising indicia to be displayed on the license plate 228. Once the vehicle owner selects the desired advertising indicia, the selection is transmitted from the web interface 160 to the system server 162.

Figure 4:
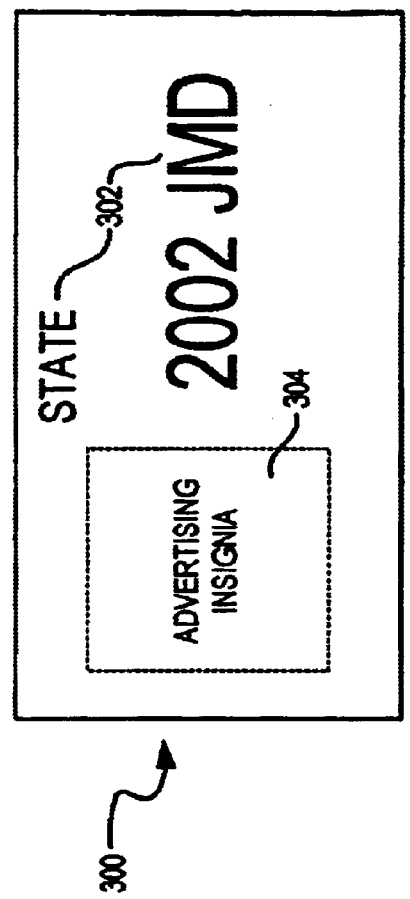
FIG. 4 is block diagram illustrating the a front elevation view of a vehicle license plate according to the present invention; and, FIG. 5 is an overview chart summarizing the licensing process.
Figure 5:
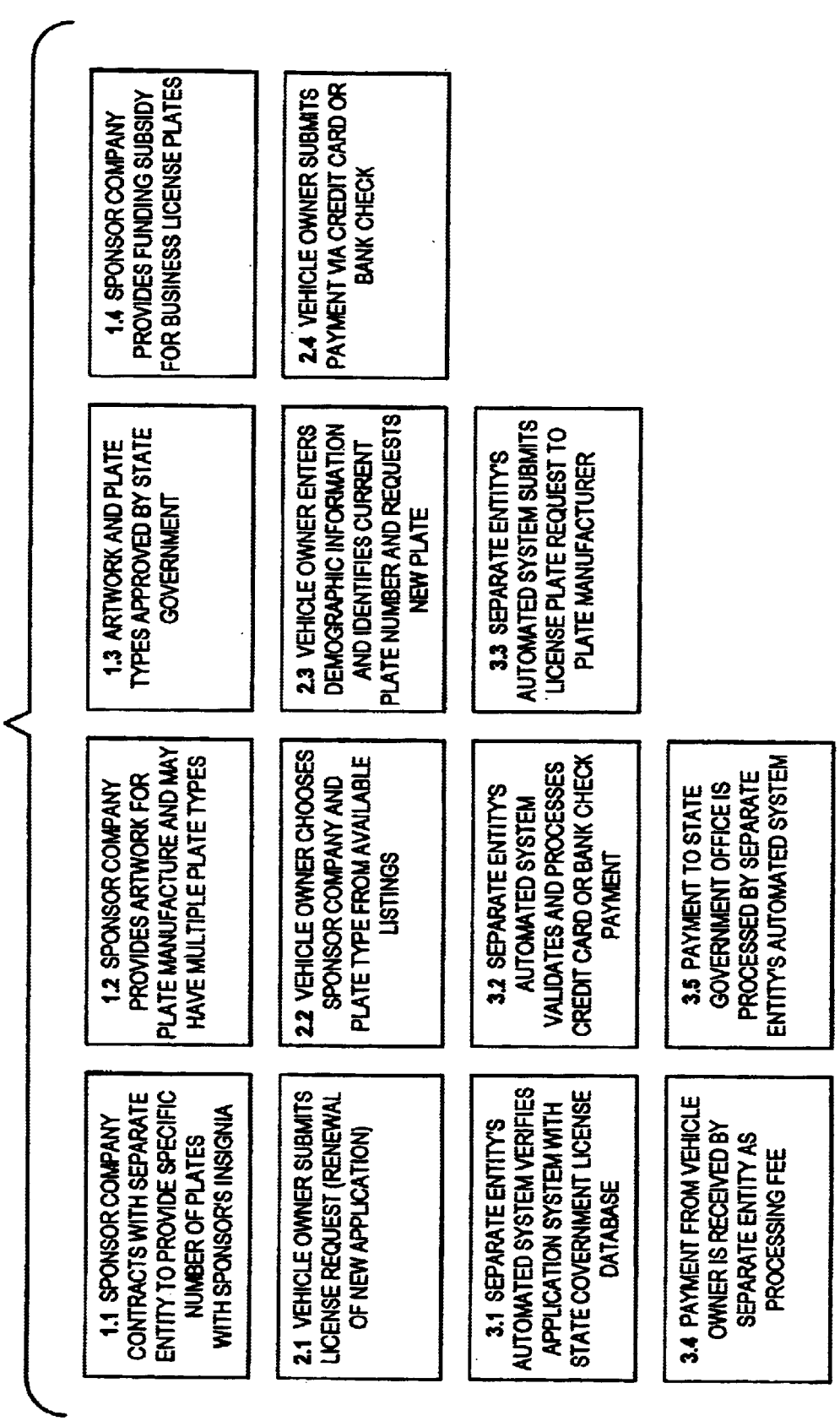

According to the method of the present invention, the system server 162 also receives an input transmission from the third party server of registration indicia 214. The predetermined registration information may include generic or selected alphanumeric characters or other relevant data to be displayed on the issued license plate 300. The system server 162 then associates the advertising indicia 304, the input vehicle owner information and the registration indicia 302. The server than transmits that associated data to the third party system server for processing and manufacturing the license plate. A license plate 300 bearing the registration indicia 302 and the selected advertising indicia 304 is sent to the licensing authority for issuance to the vehicle owner 238, 240. An example of such a license plate is illustrated in FIG. 4.

According to one embodiment of the present invention, the system further includes a secured hosted web page 230 stored on the system server 158. The system can validate and processes the vehicle owner's payment through the secured web page. According to this embodiment, the vehicle owner is also prompted to submit payment information 232. This payment information may include credit card, bank check or any other appropriate method of payment. The system then receives the payment information 234. The system server 158 then either internally verifies the payment information or communicates with a third party service to verify the payment information 236. Upon verification of payment and receipt of the license plate 240 bearing the selected advertising indicia 304 and the registration indicia 302, the licensing authority issues a license plate 300 to the vehicle owner.

It is understood that the present invention is not intended to be limited to executing the invention in automated form. It is contemplated that the method of the present invention be executed through written communication and exchange of forms. It is also understood that, given the above description of the embodiments of the invention, various modifications may be made by one skilled in the art. Such modifications are intended to be encompassed by the claims below.

What is claimed is:

1. A vehicle license plate system administered by a licensing authority in conjunction with a third party entity, the system comprising the steps of:
   the third party entity providing a database of advertising indicia adapted to be placed on a vehicle license plate, the database being made available to vehicle owners;
   the vehicle owner selecting an advertising indicia to be placed on a license plate;
   the third party entity providing registration indicia to be placed on the license plate;
   the third party entity providing vehicle owner information, the advertising indicia and registration indicia to the licensing authority;
   the licensing authority authorizing the issuance of a license plate to the vehicle owner having the advertising indicia and registration indicia, the license plate adapted to be affixed to the vehicle.

2. The system of claim 1, wherein the step of authorizing the issuance of a license plate vehicle license plate comprises authorizing the issuance of a license plate having a generally planar support member adapted to be affixed to a vehicle, a vehicle registration indicia positioned on the support member; and an advertising indicia positioned on the support member.

3. A method of generating and administering the issuance of vehicle license plates, the method comprising the steps of:
   providing a system server, the system server being in operable communication with a third party system server, the third party system server having a database stored thereon, the third party database comprising a plurality of advertising indicia adapted to be placed on a vehicle license and a plurality of registration indicia;
   providing a web interface, wherein the web interface is operably connected to the system server and the plurality of advertising indicia are viewable through the web interface, the web interface being adapted to for receiving input commands;
   displaying a prompt on the web interface prompting an input transmission of vehicle owner information;
   receiving an input transmission from the web interface of vehicle owner information;
   displaying a prompt on the web interface prompting an input transmission corresponding to one of the plurality of advertising indicia;
   receiving an input transmission from the web interface of a selected one of the plurality of advertising indicia;
   receiving an input transmission from the third party server of registration indicia;
   associating the input transmission of the selected one of the plurality of advertising indicia, the input transmission of the vehicle owner information and the input transmission of the registration indicia; and,
   transmitting the associated selected advertising indicia, vehicle owner information and registration indicia to the third party system server.

4. The method of claim 3, further comprising the steps of:
   receiving a license plate having the advertising indicia and registration indicia; and
   issuing the licenses plate having the advertising indicia and registration indicia to the vehicle owner.

5. The method of claim 3, wherein the system server further comprises at least one secured hosted web page, the method further comprising the step of verifying the vehicle owner information with a governmental license databases.

6. The method of claim 3, further comprising the step of receiving the input transmission of payment information.

7. The method of claim 6, further comprising the step of processing the payment information.

8. A computer program for generating and administering the issuance of vehicle license plates, the computer program comprising:
   a first code segment for accessing a third party system server having a first database and a second database stored thereon, wherein the first database comprises a plurality of advertising indicia adapted to be placed on a vehicle license, and the second database comprises a plurality of registration indicia;
   a second code segment for receiving an input transmission from the first database of the plurality of advertising indicia;
   a third code segment for receiving an input transmission of vehicle owner information;
   a fourth code segment for receiving an input transmission corresponding to a selected one of the plurality of advertising indicia;

a fifth code segment for receiving an input transmission from the second database of the registration indicia;

a sixth code segment for associating the input transmission of the registration indicia with the input transmission of vehicle owner information and the input transmission of the selected advertising indicia;

a seventh code segment for transmitting the associated data to the third party system server.

9. The computer program of claim 8, further comprising a code segment for receiving the input transmission of payment information.

10. The computer program of claim 9, further comprising a code segment for processing the payment information.

* * * * *